Sept. 13, 1966  K. H. SCHNEIDER  3,273,060
EXPANDED SCALE AMMETER INCLUDING A BRIDGE BIASED
TRANSISTOR DIFFERENTIAL AMPLIFIER
Filed March 13, 1962

INVENTOR
KURT H. SCHNEIDER
BY Ray C. Hopgood
ATTORNEY

United States Patent Office 3,273,060
Patented Sept. 13, 1966

3,273,060
EXPANDED SCALE AMMETER INCLUDING A BRIDGE BIASED TRANSISTOR DIFFERENTIAL AMPLIFIER
Kurt H. Schneider, Maspeth, N.Y., assignor to Expando Meter Company, a division of A & M Instrument Service, Inc., Long Island, N.Y., a corporation of New York
Filed Mar. 13, 1962, Ser. No. 181,225
8 Claims. (Cl. 324—131)

This invention relates to an expanded scale ammeter which is adapted to indicate current values between a predetermined, non-zero starting current level and a predetermined full scale deflection current level. The invention is characterized by a novel, low impedance current bridge circuit which can be adapted to balance at any desired starting current level and which produces a substantially linear unbalance current for current values above the starting current value. The invention is useful in any application which involves the measurement of current.

Many different expanded scale voltmeter circuits have been devised in the prior art, but these circuits are not useful in ammeters because voltmeters use high impedance input circuits whereas ammeters require low impedance input circuits. And since expanded scale meter circuits have many important advantages over standard meter circuits, particularly with regard to accuracy and resolution, it is therefore desirable to have an expanded scale meter circuit which can be used in connection with ammeters.

Accordingly, one object of this invention is to provide an expanded scale ammeter circuit.

Another object of this invention is to provide an expanded scale ammeter circuit having a low input impedance in the millivolt range.

An additional object of this invention is to provide an amplifying expanded scale ammeter circuit in which a relatively low power input produces a relatively large deflection in a high impedance milliammeter.

Other objects and advantages of the invention will be apparent to those skilled in the art from the following description of one specific embodiment thereof, as illustrated in the attached drawings, in which.

Figure 1:
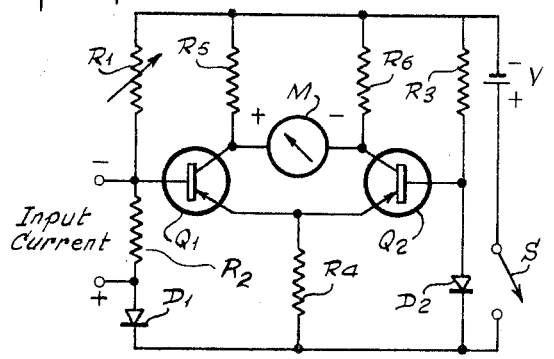
FIG. 1 is a schematic circuit diagram of one embodiment of the invention.

Referring to FIG. 1, one specific embodiment of this invention contains a first impedance bridge circuit comprising R1, R2, D1, D2, and R3. R1, R3, and D2 each constitute one arm of the bridge, and R2 and D1 together constitute the fourth arm of the bridge. An amplifier bridge circuit is coupled between the four corner junctions of the impedance bridge circuit. This amplifier bridge circuit contains transistors Q1 and Q2 and resistors R4, R5, and R6, which together form a differential amplifier. A milliammeter M is coupled across the amplifier bridge circuit, and a D.C. voltage source V is coupled across both of the bridge circuits via a switch S.

In the amplifier bridge circuit, transistors Q1 and Q2 are preferably identical in their operating characteristics and load resistors R5 and R6 are preferably equal in resistance value. Therefore, the current flow through meter M will be proportional to the difference in potential between the bases of the two transistors. When the base potential of Q1 is equal to the base potential of Q2, no current will flow through meter M. When the base potential of Q1 is more negative than the base potential of Q2, current will flow through meter M in the polarity noted on FIG. 1. When the base potential of Q1 is more positive than the base potential of Q2, current will flow through meter M in the opposite direction. Meter M is selected to deflect only for current flow in one direction, and it is connected to deflect for the polarity of current flow indicated in FIG. 1. Therefore, current flow in the opposite direction will only serve to move the needle of meter M from its zero position to the adjacent end stop. This backward movement does not harm the meter in any way, but rather provides a useful indication that the circuit is operating, as will be explained more fully below.

Figure 2:
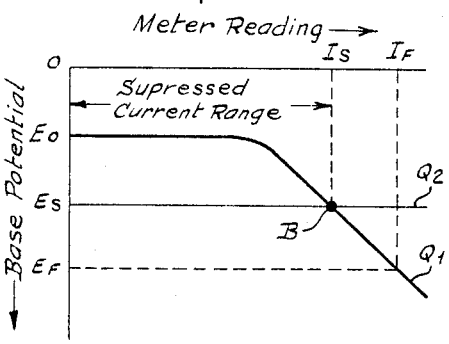
FIG. 2 is a graph illustrating the operation of the embodiment shown in FIG. 1.

The operation of the above described circuit can be more readily understood with reference to the chart of FIG. 2, which shows the relation between the base potential of transistors Q1 and Q2 and the indication of meter M. The base of Q2 is initially biased to a starting voltage level $E_s$ by the corresponding legs of the impedance bridge circuit and the base of Q1 is initially biased to a more positive level $E_o$ by its corresponding legs of the impedance bridge circuit. Therefore, the amplifier bridge circuit is initially unbalanced in the polarity which produces a backward deflection in meter M. The backward deflection thus indicates that the normal operating voltage is present in the circuit when switch S is turned on. The absence of an initial backward deflection indicates that the voltage source V has failed, or that switch S has failed, or that meter M has failed. This indication is particularly important in expanded scale circuits, which do not begin to deflect until a predetermined threshold has been reached. Without some initial indication there would be no way to tell whether an absence of meter deflection meant that the input was below the threshold value or that the measuring circuit was inoperative.

Input current is applied to the impedance bridge via input resistor R2 in the polarity indicated in FIG. 1. This input current adds to the negative bias on the base of Q1 by virtue of the voltage drop across R2, which is selected to be low in resistance value to provide a low impedance input for the circuit. When the input current rises to a high enough level, the base potential of Q1 will equal the base potential of Q2 as indicated by point B in FIG. 2, which defines the starting current level $I_s$ for the ammeter circuit. Any further increase in input current will produce a forward deflection in the needle of meter M up to a predetermined full scale current value $I_f$. Transistors Q1 and Q2 are selected to have substantially linear characteristics in the base potential range $E_S$ to $E_F$, whereby the scale of meter M can be calibrated in linear current units ranging from $I_S$ to $I_F$.

It should be noted that the amplifier bridge circuit amplifies the input current so that a relatively high impedance meter can be used in the circuit without reducing sensitivity. The sensitivity of this circuit can be set to any desired level by selecting the appropriate amplification factor in the amplifiers. It should also be noted that the common emitter resistor R4 could be replaced by two independent emitter resistors, if desired, but that the common emitter resistor is preferable because it magnifies the unbalance voltage between the collectors of the two transistors. With the common emitter resistor, an increase in the collector current of Q1 will produce a corresponding decrease in the collector current of Q2 through the common emitter resistor. This push-pull action is desirable because it doubles the amplification of the circuit without any change in the transistor elements. In addition, it should be noted that the amplifier bridge circuit is completely symmetrical, which means that the meter indication will be substantially independent of temperature variations and voltage source variations.

In the impedance bridge circuit, diodes D1 and D2 are preferably temperature compensated silicon junction diodes, which provide stable bias levels for the two transistors. R2 is selected to produce a voltage drop which is large enough to produce full scale deflection of meter M at the desired full scale input current. The exact value of R2 will vary in accordance with the ratio of full scale current to suppressed current, and the characteristics of the transistors. With a full scale reading of 100 ma., however, the value of R2 will ordinarily run up to 1 to 2 ohms. Resistors R1 and R3 are selected to produce the desired initial bias voltages $E_o$ and $E_s$ on their respective transistor bases, which also depends on the characteristics of the transistors and on the starting current and full scale deflection current. One of these two resistors is preferably adjustable, for purposes of calibration. In this particular embodiment of the invention resistor R1 is adjustable and the meter circuit is adjusted to its correct starting value by applying a known current equal to $I_s$ to the current input terminals and adjusting R1 for a zero reading on meter M. The full scale reading is calibrated by applying a known current equal to $I_F$ to the current input terminals and turning the mechanical needle adjustment on meter M for a full scale indication thereon.

Figure 3:
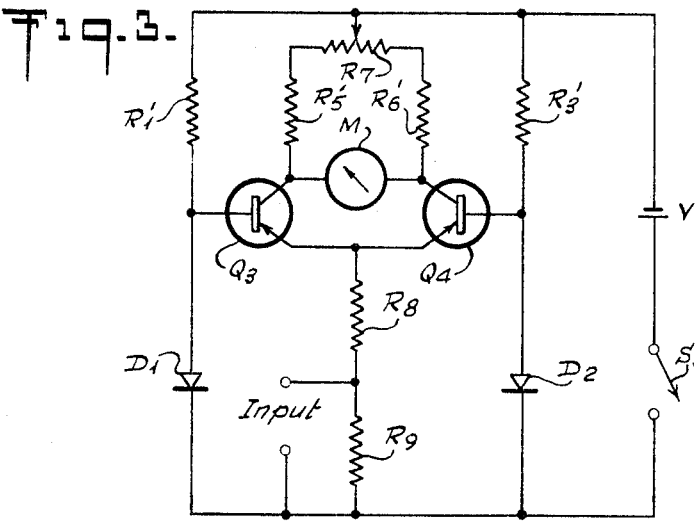
FIG. 3 is a schematic circuit diagram of a second embodiment of this invention.

FIG. 3 shows a second embodiment of the invention. This embodiment is similar to the embodiment of FIG. 1 in its general structure and principles of operation, but it differs in that it employs amplifier circuits which have different voltage gain factors and applies the input current to both transistors instead of to one of them. The different voltage gain factors can be realized by using different resistance values for collector resistors R5' and R6', or by selecting transistors Q3 and Q4 to have different current gain factors, or both. When the transistor circuits are thus adapted to have different voltage gains, a common input signal applied to the emitters or bases of the transistors will have a different effect on the collector potential of the two transistors, thereby developing a voltage differential between the collectors.

Transistors Q3 and Q4 are biased by their respective base impedance networks and common emitter impedances so that the collector potential of the transistor having the lower gain is initially higher than the collector potential of the transistor having the higher gain. The meter M is connected in opposing polarity to the initial potential difference between the two collectors, such that it is initially deflected in the reverse direction. When an input current is applied to input resistor R9, the bias on each transistor will change by the same amount, but the effect on the collector potential will be greater in the transistor having the higher gain. Therefore, when the input current reaches a predetermined value, the two collectors will reach a balance point, and any further increase in the input current will produce a forward deflection of the meter. The balance point for the two collectors is, of course, selected to correspond to the desired starting current $I_s$ for the circuit, and the characteristics of the two transistors are chosen so that they will operate in a substantially linear portion of their characteristic curves between the desired starting current $I_s$ and the desired full scale current $I_f$. The exact resistor values, voltages, and transistor types required for any given input current range can be easily computed by those skilled in the art from well known prior art formulas. It is, however, preferable to employ transistors which have an appreciable difference in gain, since the overall gain of this circuit is proportional to the gain of one amplifier circuit minus the gain of the other amplifier circuit.

It should be noted that the circuit of FIG. 3 also differs from the circuit of FIG. 1 in that resistor R1', which corresponds to resistor R1, is fixed in value and a potentiometer R7 is provided to calibrate the circuit. R7 is preferably small in resistance value with respect to collector resistors R5' and R6', so that it will not have any significant effect on the gain of the two amplifier circuits, and a similar calibration potentiometer could be employed in the circuit of FIG. 1 if desired. In calibrating the circuit with potentiometer R7, a known input current equal to the desired starting current $I_s$ is applied to the input terminals of the circuit, and R7 is adjusted for a zero indication on the meter. The full scale reading is calibrated by applying a known current equal to the desired full scale current $I_F$ to the current input terminals and turning the mechanical needle adjustment on meter M for a full scale indication thereon.

Figure 4:
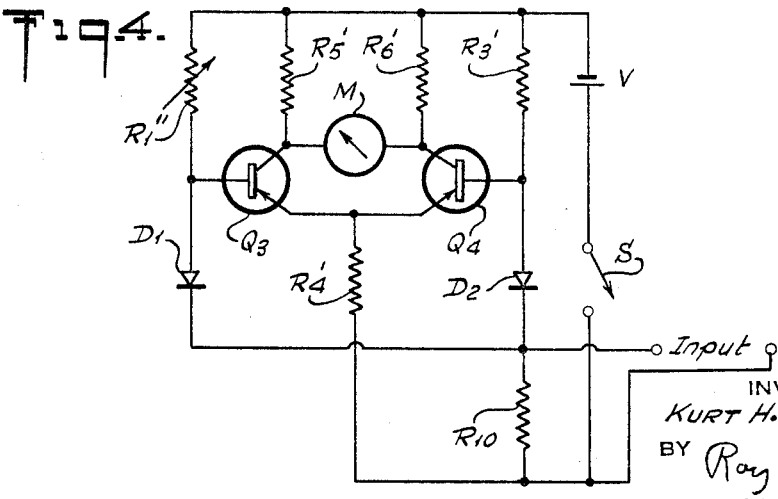
FIG. 4 is a schematic circuit diagram of a third embodiment of this invention.

The common emitter resistors R8 and R9 of FIG. 3 are selected to provide the appropriate degree of self-bias to the two amplifier circuits when taken together, and R9 is selected to provide the desired input impedance, which is preferably as low as possible. In some cases, the input impedance requirements of the circuit may be incompatible with the self bias requirements, and in these cases the common input signal can be applied to the bases of transistors Q3 and Q4, rather than to the emitters thereof, by the modified circuit arrangement shown in FIG. 4. In this circuit, the input current is applied to R10, which is in series with diodes D1 and D2, and the emitter current of transistors Q3 and Q4 flow through an independent emitter resistor R4', which corresponds to resistor R4 in the circuit of FIG. 1. The circuit of FIG. 4 utilizes a variable resistor R1'', which corresponds to resistor R1 of FIG. 1, and which is used to calibrate the circuit as described previously.

It should be noted that the diodes shown in all three of the above described embodiments of the invention could be replaced by resistors, if desired, without changing the operation of any of the circuits. For stability and accuracy of operation, however, it is preferable to use temperature compensated diodes. It should also be noted that it may be desirable to add other temperature compensating elements to the differential gain amplifier circuits of FIGS. 3 and 4, since they are not symmetrical in structure as is the circuit of FIG. 1.

From the foregoing description it will be apparent that this invention provides an expanded scale ammeter circuit having a low input impedance in the millivolt range. It will also be apparent that this invention provides an expanded scale ammeter circuit in which a relatively low power input produces a relatively large output in a high impedance milliammeter. And it should be understood that this invention is by no means limited to the specific circuit disclosed herein by way of example, since many modifications can be made in the disclosed structure without departing from the basic teaching of this invention. For example, although the transistors Q1, Q2, Q3 and Q4 are shown to be PNP transistors, they could just as well be NPN transistors, or vacuum tubes for that matter, without changing the basic operation of the circuit. These and many other modifications of the disclosed structure will be apparent to those skilled in the art, and this invention includes all modifications falling within the scope of the following claims.

I claim:

1. An expanded scale ammeter circuit comprising a plurality of impedance elements coupled together to form an impedance bridge having four legs and four leg junctions, a transistor differential amplifier circuit having two signal input terminals and two power input terminals, said amplifier circuit containing a meter, said meter being adapted to produce a meter indication proportional to the magnitude of current therethrough in one direction of current flow but not for the opposite direction of current flow and also proportional to the difference of potential between said two signal input terminals, said two signal input terminals being coupled to two opposing junctions of said bridge circuit, a D.C. voltage source coupled across the other two junctions of said bridge circuit and across the power input terminals of said amplifier circuit, one of said bridge legs comprising a low impedance input shunt having an impedance in the range of approximately 0 to 2 ohms, said low impedance input shunt being connected to current input terminals to receive an input current applied directly thereto and to pass all of said latter current therethrough to develop an input signal proportional thereto at one of said two opposing junctions of said bridge circuit, and said impedance bridge being adapted to initially bias said differential amplifier circuit to produce a current flow in said other direction through said meter when said input current is below a predetermined starting level, thereby producing a current flow in said one direction through said meter when said input current is above said predetermined starting current level, whereby said meter deflects in proportion to the magnitude of input current above said predetermined starting current level but not below said predetermined starting current level.

2. An expanded scale ammeter circuit comprising a plurality of impedance elements coupled together to form an impedance bridge circuit having four legs and four leg junctions, a first transistor D.C. amplifier and a second transistor D.C. amplifier each having a signal input terminal, a signal output terminal, and two power input terminals, said first and second amplifiers together comprising a differential amplifier, the signal input terminal of said first amplifier being coupled to a first junction of said impedance bridge circuit, the signal input terminal of said second amplifier being coupled to a second junction of said impedance bridge circuit, a D.C. voltage source coupled across the other two junctions of said impedance birdge circuit and across the power input terminals of both of said D.C. amplifiers, a D.C. ammeter coupled between the output terminals of said first and second D.C. amplifiers, said ammeter being adapted to deflect in proportion to the magnitude of current flow therethrough in one direction of current flow but not for the other direction of current flow, low impedance input shunt means in one leg of said bridge circuit adjacent to said first junction thereof, said low impedance input shunt means having an impedance in the range of approximately 0 to 2 ohms, said low impedance input shunt means being connected to current input terminals to receive an input current applied directly thereto and to pass substantially all of said latter current therethrough to develop an input signal proportional thereto at said first junction of said bridge circuit, said bridge circuit being adapted to initially bias said first and second amplifiers to produce a current flow in said other direction through said ammeter when said input current is below a predetermined starting level, thereby producing a current flow in said one direction through said ammeter when said input current is above said predetermined starting current level, whereby said ammeter deflects in proportion to the magnitude of input current above said predetermined starting current level but not below said predetermined starting current level.

3. The combination defined in claim 2 wherein said first and second D.C. amplifiers are cross coupled such that an increase in the output signal of said first amplifier produces a decrease in the output signal of said second amplifier.

4. The combination defined in claim 2 wherein said first and second amplifiers are initially biased by the potential on said first and second junctions of said impedance bridge circuit, and wherein the impedance elements of said impedance bridge circuit are adapted to initially bias said first and second amplifiers to produce a current flow in said other direction through said ammeter when said input current is below said predetermined starting level.

5. The combination defined in claim 2 wherein said transistor amplifier circuits are cross coupled by a common emitter resistor so that an increase in emitter current in one transistor produces a decrease in emitter current in the other transistor and vice versa.

6. An expanded scale ammeter circuit comprising a first and second transistor element each having base, collector, and emitter electrodes, a D.C. voltage source having two output terminals, a first resistor coupled between the collector electrode of one transistor and one terminal of said voltage source, a second resistor coupled between the collector electrode of said other transistor and said one terminal of said voltage source, a third resistor coupled between the emitter electrodes of both transistors and the other terminal of said voltage source, a D.C. ammeter coupled between the collector electrodes of said transistors, said ammeter being adapted to deflect in proportion to the magnitude of current flow therethrough for one direction of current flow but not for the other direction of current flow, low impedance input shunt means coupled between the emitter and base electrodes of one of said transistors, said shunt means comprising one leg of an impedance bridge, said shunt means having an impedance in the range of approximately 0 to 2 ohms, said input shunt means being connected to current input terminals to receive an input current applied directly thereto and to pass all of said latter current therethrough to develop an input signal proportional thereto on said base electrode, means adapted to initially bias said first and second transistors to produce a current flow in said other direction through said ammeter when said input current is below a predetermined starting level, thereby producing a current flow in said one direction through said ammeter when said input current is above said predetermined starting level, whereby said ammeter deflects in proportion to the magnitude of input current above said predetermined starting current level but not below said predetermined starting current level.

7. The combination defined in claim 6 in which said bias means includes a fourth resistor coupled between the base and collector of said first transistor, a first diode coupled in series with said shunt means and said third resistor between the base and emitter of said first transistor, a fifth resistor coupled between the base and collector of said second transistor, and a second diode coupled in series with said third resistor between the baes and emitter of said second transistor.

8. The combination defined in claim 7 wherein said diodes are coupled in such polarity as to be back biased by said voltage source, and wherein said input shunt means is coupled in series with one of said diodes.

References Cited by the Examiner
UNITED STATES PATENTS

| | | | |
|---|---|---|---|
| 2,506,384 | 5/1950 | Rich | 324—123 |
| 2,613,235 | 10/1952 | Grunsky | 324—123 |
| 2,802,181 | 8/1957 | Gorski | 324—131 X |
| 2,944,216 | 7/1960 | Allenden | 324—123 |
| 3,068,406 | 12/1962 | Dellinger | 324—131 |

WALTER L. CARLSON, *Primary Examiner.*

R. V. ROLINEC, *Assistant Examiner.*